(12) United States Patent
Granfors et al.

(10) Patent No.: US 6,353,654 B1
(45) Date of Patent: Mar. 5, 2002

(54) METHOD AND APPARATUS FOR COMPENSATING FOR IMAGE RETENTION IN AN AMORPHOUS SILICON IMAGING DETECTOR

(75) Inventors: Paul R. Granfors; Sussan Pourjavid, both of Sunnyvale, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/475,874

(22) Filed: Dec. 30, 1999

(51) Int. Cl.[7] .............................................. G01N 23/04

(52) U.S. Cl. ........................... 378/62; 378/19; 378/98

(58) Field of Search ................... 378/4, 19, 62, 378/98

(56) References Cited

U.S. PATENT DOCUMENTS 4,427,999 A * 1/1984 Kuehnle et al. ............ 358/300
4,468,707 A * 8/1984 Kuehnle et al. ............ 358/300

* cited by examiner

Primary Examiner—David V. Bruce
(74) Attorney, Agent, or Firm—Fletcher, Yoder & Van Someren

(57) ABSTRACT

A technique for compensating for a retained image includes sampling image data from a digital detector following termination of a first exposure to model decay of the retained image. Based upon the modeled decay, further decay of the retained image is predicted. The predicted decay values are employed to correct or compensate for the decaying retained image in a subsequent exposure. The technique is particularly well suited to compensation of retained images in fluoroscopic exposures following radiographic exposures in a digital x-ray system.

26 Claims, 3 Drawing Sheets

METHOD AND APPARATUS FOR COMPENSATING FOR IMAGE RETENTION IN AN AMORPHOUS SILICON IMAGING DETECTOR

FIELD OF THE INVENTION

The present invention relates generally to a technique for compensating for image retention in an imaging detector, such as those used in digital x-ray imaging systems. More particularly, the invention relates to compensation of image retention through prediction of decay of a ghost image produced by an earlier image in a sequence, and for enhancing later images in the sequence based upon the predicted decay.

BACKGROUND OF THE INVENTION

Digital x-ray imaging systems are becoming increasingly widespread for producing digital data which can be reconstructed into useful radiographic images. In current digital x-ray imaging systems, radiation from a source is directed toward a subject, typically a patient in a medical diagnostic application. A portion of the radiation passes through the patient and impacts a detector. The surface of the detector converts the radiation to light photons which are sensed. The detector is divided into a matrix of discrete picture elements or pixels, and encodes output signals based upon the quantity or intensity of the radiation impacting each pixel region. Because the radiation intensity is altered as the radiation passes through the patient, the images reconstructed based upon the output signals provide a projection of the patient's tissues similar to those available through conventional photographic film techniques.

Digital x-ray imaging systems are particularly useful due to their ability to collect digital data which can be reconstructed into the images required by radiologists and diagnosing physicians, and stored digitally or archived until needed. In conventional film-based radiography techniques, actual films were prepared, exposed, developed and stored for use by the radiologist. While the films provide an excellent diagnostic tool, particularly due to their ability to capture significant anatomical detail, they are inherently difficult to transmit between locations, such as from an imaging facility or department to various physician locations. The digital data produced by direct digital x-ray systems, on the other hand, can be processed and enhanced, stored, transmitted via networks, and used to reconstruct images which can be displayed on monitors and other soft copy displays at any desired location. Similar advantages are offered by digitizing systems which convert conventional radiographic images from film to digital data.

Despite their utility in capturing, storing and transmitting image data, digital x-ray systems are still overcoming a number of challenges. For example, x-ray systems may be employed for a range of different types of examination, including radiographic and fluoroscopic imaging. Among other distinctions, these two types of imaging examinations are characterized by significantly different radiation levels used to generate the image data. Specifically, radiographic imaging sequences employ substantially higher radiation levels than fluoroscopic imaging sequences. In a number of applications, it may be desirable to perform both types of imaging sequences sequentially to obtain different types of data and to subject patients to lower overall radiation levels. However, current digital x-ray systems may encounter difficulties in performing fluoroscopic imaging sequences following radiological sequences.

Specifically, current digital x-ray systems employ amorphous silicon detectors with arrays of photodiodes and thin film transistors which beneath an x-ray scintillator. Incident x-rays interact with the scintillator to emit light photons which are absorbed by the photodiodes, creating electron-hole pairs. The diodes, which are initially charged with several volts of reverse bias, are thereby discharged in proportion to the intensity of the x-ray illumination. The thin film transistor switches associated with the diodes are then activated sequentially, and the diodes are recharged through charge sensitive circuitry, with the charge needed for this process being measured.

Raw signals from the detector may require several corrections to yield an accurate measure of the incident x-ray intensity. One of these corrections is for offset, or the signal which exists in the absence of x-ray illumination. One source of this offset is leakage current in the diodes. Another source of offset in current digital x-ray detectors is related to the previous history of illumination of the diodes. Due to the nature of the amorphous silicon of the detector panel, the photodiodes contain traps which are filled after x-ray excitation, and which thereafter empty in a decay process with a relatively long time constant. As a result, a decaying image is retained by the detector.

The magnitude of image retention in x-ray detectors is relatively small, and decays with time as the traps empty thermally. In single-shot radiographic applications, image retention does not generally cause problems because a relatively long period of time exists between exposures. An offset image for correction of a subsequent exposure is generally feasible fairly close in time prior to the exposure. In the latter mode of operation, the error in the image after offset correction is equal to the difference in the retained image between the time of the x-ray image and the time of the offset image. If sufficient time has elapsed between the previous x-ray exposure, this difference is minimal.

In fluoroscopic imaging, on the other hand, an accurate representation of the offset can be obtained by reading the detector continually between x-ray exposure periods, and averaging these offset images. The averaged offset image can be frozen at the start of x-ray activation, and used to correct the x-ray images. As long as the x-ray exposure interval is not too long, the retained signal in the offset image will closely approximate that in the x-ray images, and the error due to the retained signal will be small in the corrected images.

Image retention in x-ray detectors poses a substantial problem, however, in applications requiring mixed radiographic and fluoroscopic operation. Again, because the fluoroscopic signal levels are substantially lower (eg. two to three orders of magnitude smaller) than the radiographic signals, when a fluoroscopic imaging sequence follows a radiographic exposure, the retained image, although a small fraction of the radiographic signal, can be comparable to or even larger than the fluoroscopic signal. If uncorrected, a ghost of the radiographic image will appear in the reconstructed fluoroscopic image.

There is a need, therefore, for an improved technique for compensating for retained images in discrete pixel image detectors. There is a particular need for a technique which can be applied to digital x-ray systems to compensate for image retention in sequential imaging exposures, such as in fluoroscopic exposures following radiographic exposures.

SUMMARY OF THE INVENTION

The present invention provides a technique designed to respond to these needs. The invention is particularly well suited to the specific application of compensating for image retention following radiographic exposures in digital x-ray systems. However, the technique may be advantageously employed in other domains, including within and outside the medical diagnostic imaging field, where appropriate. Moreover, the present technique may be employed in both existing systems, as well as in new or future digital imaging systems, particularly those employing amorphous silicon detectors. Because the technique is based upon sampling of data from the detector, and processing the sampled data in accordance with a computer-implemented routine, it is susceptible to use in imaging systems both in their basic control algorithms, as well as in patches or enhancements to existing control or signal processing software.

The technique is based upon a sampling of image data during a period following a first exposure or examination. The sampled data represents values for individual pixel regions of an image matrix. A plurality of sampled data sets is preferably acquired over time. The time period for acquisition of the data may generally be a fixed sampling interval of the detector and its associated control circuitry. Based upon the sampled data, the decay of the retained image is characterized and predicted based upon a prediction model. Predicted values of the decaying retained image are then used to correct or compensate for any remaining retained image which may be present through all or part of a subsequent imaging exposure or examination.

DETAILED DESCRIPTION OF THE INVENTION

Figure 1:
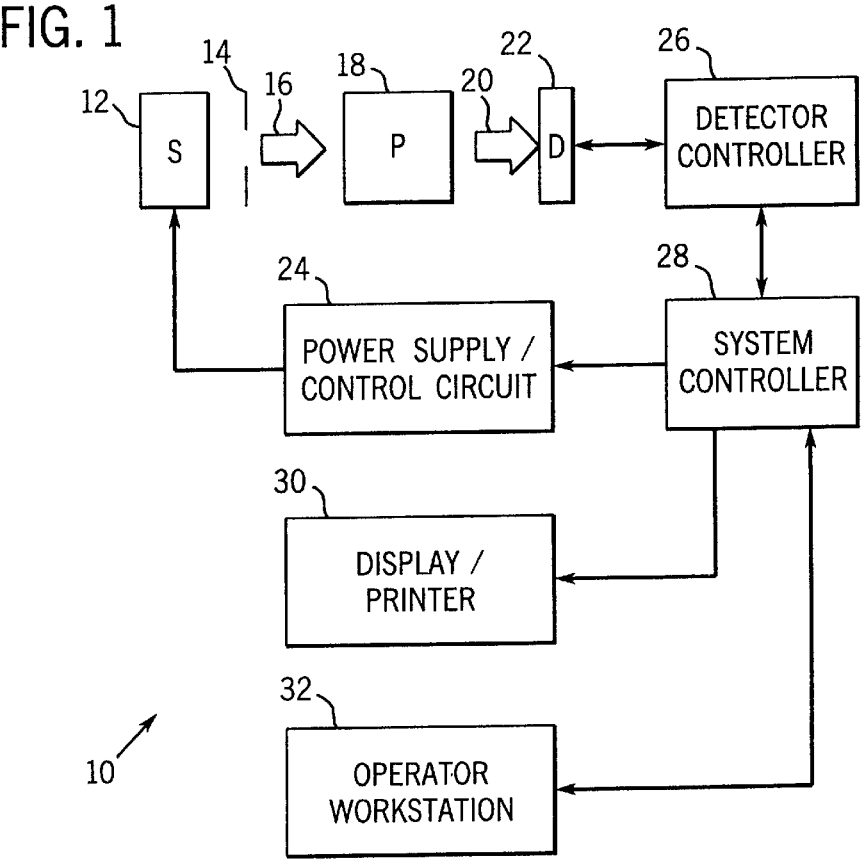
FIG. 1 is a diagrammatical overview of a digital x-ray imaging system in which the present technique is incorporated.

FIG. 1 illustrates diagrammatically an imaging system 10 for acquiring and processing discrete pixel image data. In the illustrated embodiment, system 10 is a digital x-ray system designed both to acquire original image data, and to process the image data for display in accordance with the present technique. Throughout the following discussion, however, while basic and background information is provided on the digital x-ray system, it should be borne in mind that aspects of the present technique may be applied to other types of systems for compensating for decaying retained images. Similarly, aspects of the present technique may be applied to viewing stations designed to receive or access image data acquired and stored separately from the viewing station.

In the embodiment illustrated in FIG. 1, imaging system 10 includes a source of x-ray radiation 12 positioned adjacent to a collimator 14. Collimator 14 permits a stream of radiation 16 to pass into a region in which a subject, such as a human patient 18 is positioned. A portion of the radiation 20 passes through or around the subject and impacts a digital x-ray detector, represented generally at reference numeral 22. As described more fully below, detector 22 converts the x-ray photons received on its surface to lower energy photons, and subsequently to electric signals which are acquired and processed to reconstruct an image of the features within the subject.

Source 12 is controlled by a power supply/control circuit 24 which furnishes both power and control signals for examination sequences. Moreover, detector 22 is coupled to a detector controller 26 which commands acquisition of the signals generated in the detector. Detector controller 26 may also execute various signal processing and filtration functions, such as for initial adjustment of dynamic ranges, interleaving of digital image data, and so forth. Both power supply/control circuit 24 and detector controller 26 are responsive to signals from a system controller 28. In general, system controller 28 commands operation of the imaging system to execute examination protocols and to process acquired image data. In the present context, system controller 28 also includes signal processing circuitry, typically based upon a general purpose or application-specific digital computer, associated memory circuitry for storing programs and routines executed by the computer, as well as configuration parameters and image data, interface circuits, and so forth. In the embodiment illustrated in FIG. 1, system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
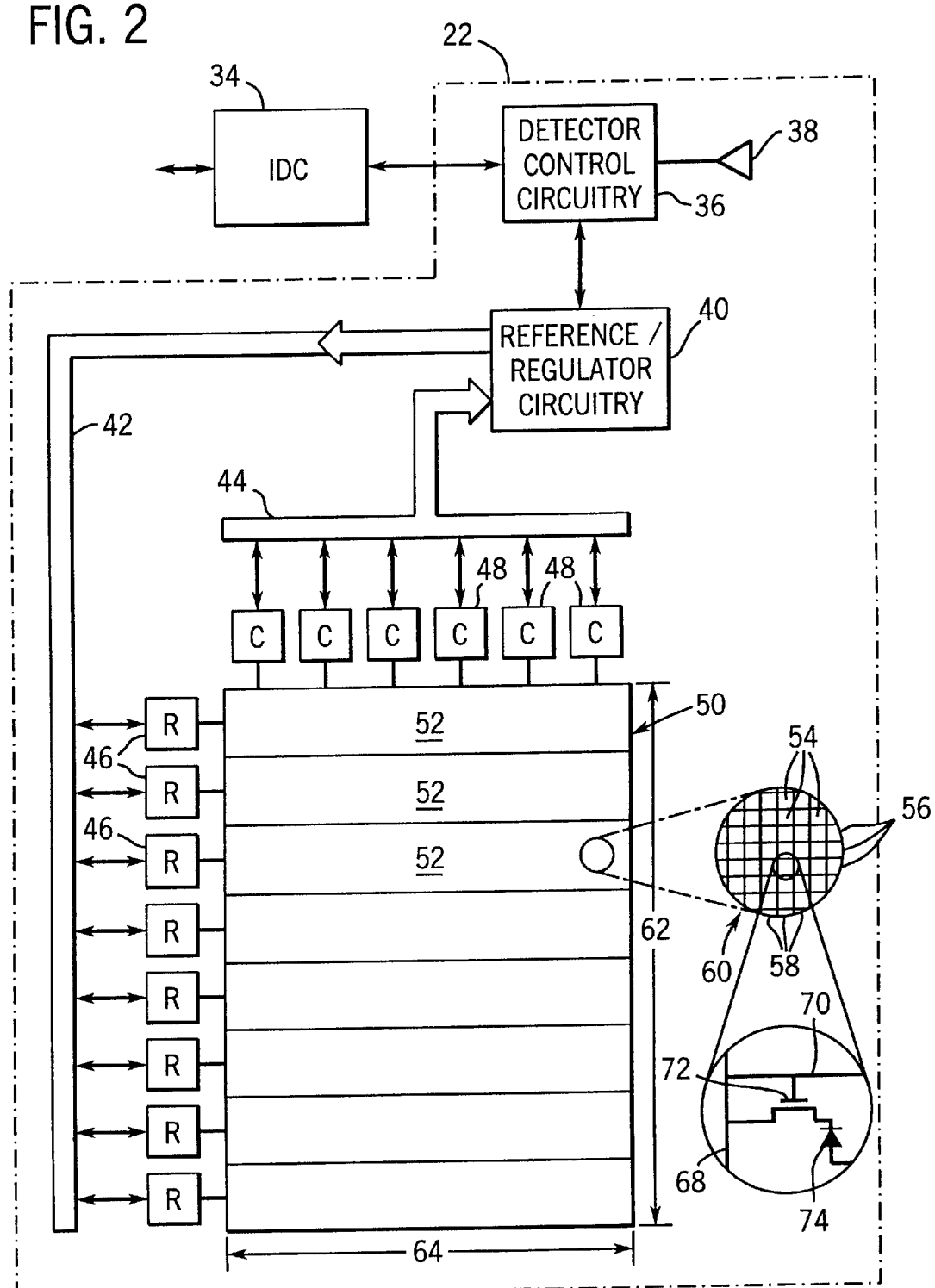
FIG. 2 is a diagrammatical representation of certain of the functional circuitry for producing image data in a detector of the system of FIG. 1 to produce image data for reconstruction.

FIG. 2 is a diagrammatical representation of functional components of digital detector 22. FIG. 2 also represents an imaging detector controller or IDC 34 which will typically be configured within detector controller 26. DC 34 includes a CPU or digital signal processor, as well as memory circuits for commanding acquisition of sensed signals from the detector. IDC 34 is coupled via two-way fiberoptic conductors to detector control circuitry 36 within detector 22. IDC 34 thereby exchanges command signals for image data within the detector during operation.

Detector control circuitry 36 receives DC power from a power source, represented generally at reference numeral 38. Detector control circuitry 36 is configured to originate timing and control commands for row and column drivers used to transmit signals during data acquisition phases of operation of the system. Circuitry 36 therefore transmits power and control signals to reference/regulator circuitry 40, and receives digital image pixel data from circuitry 40.

In a presently preferred embodiment illustrated, detector 22 consists of a scintillator that converts x-ray photons received on the detector surface during examinations to lower energy (light) photons. An array of photodetectors then converts the light photons to electrical signals which are representative of the number of photons or the intensity of radiation impacting individual pixel regions of the detector surface. As described below, readout electronics convert the resulting analog signals to digital values that can be processed, stored, and displayed, such as in a display 30 or a workstation 32 following reconstruction of the image. In a presently preferred embodiment, the array of photodetectors is formed on a single base of amorphous silicon. The array elements are organized in rows and columns, with each element consisting of a photodiode and a thin film transistor. The cathode of each diode is connected to the source of the transistor, and the anodes of all diodes are connected to a negative bias voltage. The gates of the transistors in each row are connected together and the row electrodes are connected to the scanning electronics described below. The drains of the transistors in a column are connected together and an electrode of each column is connected to readout electronics.

In the particular embodiment illustrated in FIG. 2, by way of example, a row bus 42 includes a plurality of conductors for enabling readout from various columns of the detector, as well as for disabling rows and applying a charge compensation voltage to selected rows, where desired. A column bus 44 includes additional conductors for commanding readout from the columns while the rows are sequentially enabled. Row bus 42 is coupled to a series of row drivers 46, each of which commands enabling of a series of rows in the detector. Similarly, readout electronics 48 are coupled to column bus 44 for commanding readout of all columns of the detector.

In the illustrated embodiment, row drivers 46 and readout electronics 48 are coupled to a detector panel 50 which may be subdivided into a plurality of sections 52. Each section 52 is coupled to one of the row drivers 46, and includes a number of rows. Similarly, each column driver 48 is coupled to a series of columns. The photodiode and thin film transistor arrangement mentioned above thereby define a series of pixels or discrete picture elements 54 which are arranged in rows 56 and columns 58. The rows and columns define an image matrix 60, having a height 62 and a width 64.

As also illustrated in FIG. 2, each pixel 54 is generally defined at a row and column crossing, at which a column electrode 68 crosses a row electrode 70. As mentioned above, a thin film transistor 72 is provided at each crossing location for each pixel, as is a photodiode 74. As each row is enabled by row drivers 46, signals from each photodiode may be accessed via readout electronics 48, and converted to digital signals for subsequent processing and image reconstruction.

Figure 3:
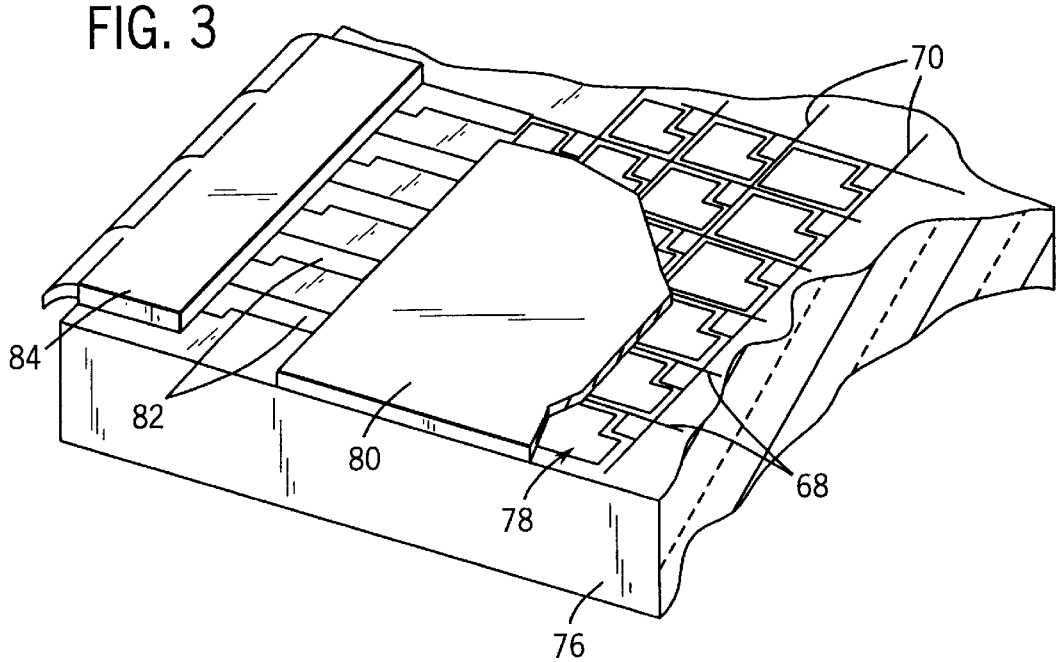
FIG. 3 is a partial sectional view illustrating an exemplary detector structure for producing the image data.

FIG. 3 generally represents an exemplary physical arrangement of the components illustrated diagramatically in FIG. 2. As shown in FIG. 3, the detector may include a glass substrate 76 on which the components described below are disposed. Column electrodes 68 and row electrodes 70 are provided on the substrate, and an amorphous silicon flat panel array 78 is defined, including the thin film transistors and photodiodes described above. A scintillator 80 is provided over the amorphous silicon array for receiving radiation during examination sequences as described above. Contact fingers 82 are formed for communicating signals to and from the column and row electrodes, and contact leads 84 are provided for communicating the signals between the contact fingers and external circuitry.

It has been found that in systems employing the foregoing structure, photodiodes 74 contain traps which are filled after x-ray excitation, and which thereafter empty with relatively long time constants. As a result, in higher exposure imaging sequences, an image may be retained by the detector which decays over time as the traps empty thermally. While in certain imaging sequences, this image retention may not pose difficulties, it may be particularly problematic where relatively low intensity radiation is employed following higher radiation level exposures. This is particularly the case where fluoroscopic exposures are performed in relatively short delays after radiographic exposures.

Figure 4:
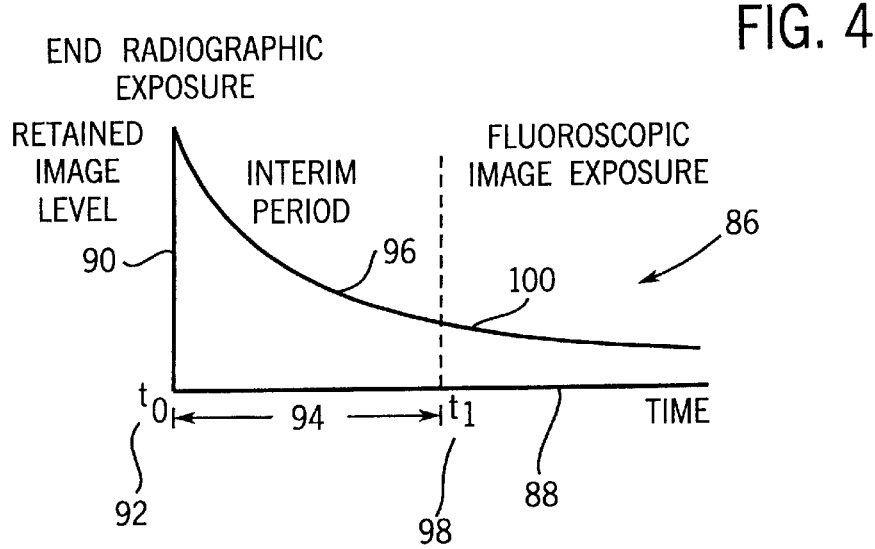
FIG. 4 is a graphical representation of a decaying retained image function illustrating the present technique for sampling data from an image detector, and predicting decay of the retained image.

The present technique provides a mechanism for analyzing and compensating for such image retention. FIG. 4 graphically illustrates the decay function 86 of a retained image following an exposure of the detector 22 to radiation. In FIG. 4, time is represented along a horizontal axis 88, with the retained image level being indicated generally by a vertical axis 90. As will be appreciated by those skilled in the art, in practice, the particular portion of the image retained at each pixel region may differ over the dynamic range of the detector, such that an entire retained image is defined by the image matrix, the portion of the image defined at each pixel region decaying from its initial value.

In the graphical illustration of FIG. 4, a radiographic exposure (or more generally a first imaging sequence or examination) ends at an initial time to as indicated at reference numeral 92. During an interim period 94, the intensity or level of the retained image decays as indicated at reference numeral 96. Interim period 94 is generally defined as the period between the end of the previous exposure and the beginning of a subsequent exposure, a fluoroscopic image exposure in the example of FIG. 4. The subsequent exposure begins at time t1, as indicated at reference numeral 98, marking the end of the interim period 94. However, because the retained image has not yet decayed to a null value, decay continues as indicated at reference numeral 100.

In the case of a fluoroscopic exposure following a radiographic exposure, and where interim period 94 is relatively short, the retained image, although decaying, may be comparable in levels, or even larger than the fluoroscopic level produced during the subsequent exposure. To correct for this retained image, the present technique samples data from the detector during interim period 94, and employs a prediction model for predicting decay 100 during the subsequent exposure based upon a model for the decay 96 during the interim period.

The modeling and prediction of the present technique proceeds as follows. In the technique, each pixel is preferably modeled as a linear, time-invariant system whose response, H(z) is unknown. This assumption is valid for relatively short periods of time. More specifically, the linear system model is based upon finite parameters, d, provided by the relationship:

$$d = [d_0 d_1 \ldots d_q]^t \quad (\text{eq.1})$$

where t denotes the transpose operation, d denotes the pixel value at sequential sampling intervals, and q denotes the order of the system.

The present technique, then, estimates the model parameters d. The model has a response:

$$\hat{H}(Z) = \sum_{k=0}^{q} d_k z^{-k}. \quad (\text{eq. 2})$$

The output of the modeled system depends upon a finite input data sequence x(n), x(n−1), . . . , x(n−q), and is given by the equation:

$$\hat{y}(n) = \sum_{k=0}^{q} d_k x(n-k). \quad \text{(eq. 3)}$$

The system identification problem is preferably resolved in the present technique by a least squares method. This least squares optimization solution in the matrix format may be expressed as follows:

$$d=(X^H X)^{-1} X^H y \quad \text{(eq. 4)};$$

where X is an N by (q+1) input data matrix as follows:

$$X = \begin{bmatrix} x(1) & 0 & \cdots & 0 \\ x(2) & x(1) & \cdots & 0 \\ \vdots & \vdots & \cdots & \vdots \\ x(N) & x(N-1) & & x(N-q) \end{bmatrix}; \quad \text{(eq. 5)}$$

and $X^H$ denotes the conjugate transpose of X. The observed output sequence, then, is represented by the relationship:

$$y=[y(1)y(2) \ldots y(N)]^t \quad \text{(eq. 6)};$$

and the least-squares solution given by Equation (4) can be expressed as follows:

$$d = R_{xx}^{-1} r_{yx}; \quad \text{(eq. 7)}$$

where $R_{xx}$ and $r_{yx}$ represent the data autocorrelation matrix and the data cross-correlation matrix, respectively.

In mixed mode applications, such as in the case of fluoroscopic exposures following radiographic exposures as illustrated in FIG. 4, interim period 94 preferably comprises several milliseconds. Depending upon the readout rate of detector 22, there are γ frames without radiation between the end of the first exposure and the beginning of the subsequent exposures. Of these frames, a quantity q+2 frames are preferably used in the present technique for predicting decay of the retained image, where q, again, is the order of the system. This prediction process is intended to compute the vector response d, as defined by equation 4 above. The q+1 of these frames are initially used as inputs, x, in equation 4, and the frames subsequently being used to provide outputs, y. That is, each output y(i) is equal to the previous input value x(i−1). It should be noted that in this application, the value N is set equal to q+1 in equation 5.

Once the response vector d has been computed, equation 3 is used to obtain the first predicted output of the system. The first predicted output of the system is then used with the previous measured input data to obtain the second predicted output of the system.

The outputs can be predicted in several manners, two of which are contemplated in the present embodiment. In a first method, the first predicted output is used as the last input value, that is:

$$x=[x(2),x(3), \ldots, x(q+1), \hat{y}(q+2)]^t \quad \text{(eq. 8)}.$$

In a second preferred method for generating the predicted outputs, a linear combination of the first predicted output and the last input value is used. This method may be expressed:

$$x=[x(2),x(3), \ldots, x(q+1), (1-\alpha)x(q+1)+\alpha\hat{y}(q+2)]^t \quad \text{(eq. 9)}.$$

It should be observed that the first method described above is a special case of the second method, in which the value α is set equal to 0. The second method provides for filtering of the output values. In trials, a value of α equal to 0.35 was used with satisfactory results.

The foregoing process is then repeated to predict further output values, indicative of decay of the retained image. The foregoing logical steps are summarized in FIG. 5.

Figure 5:
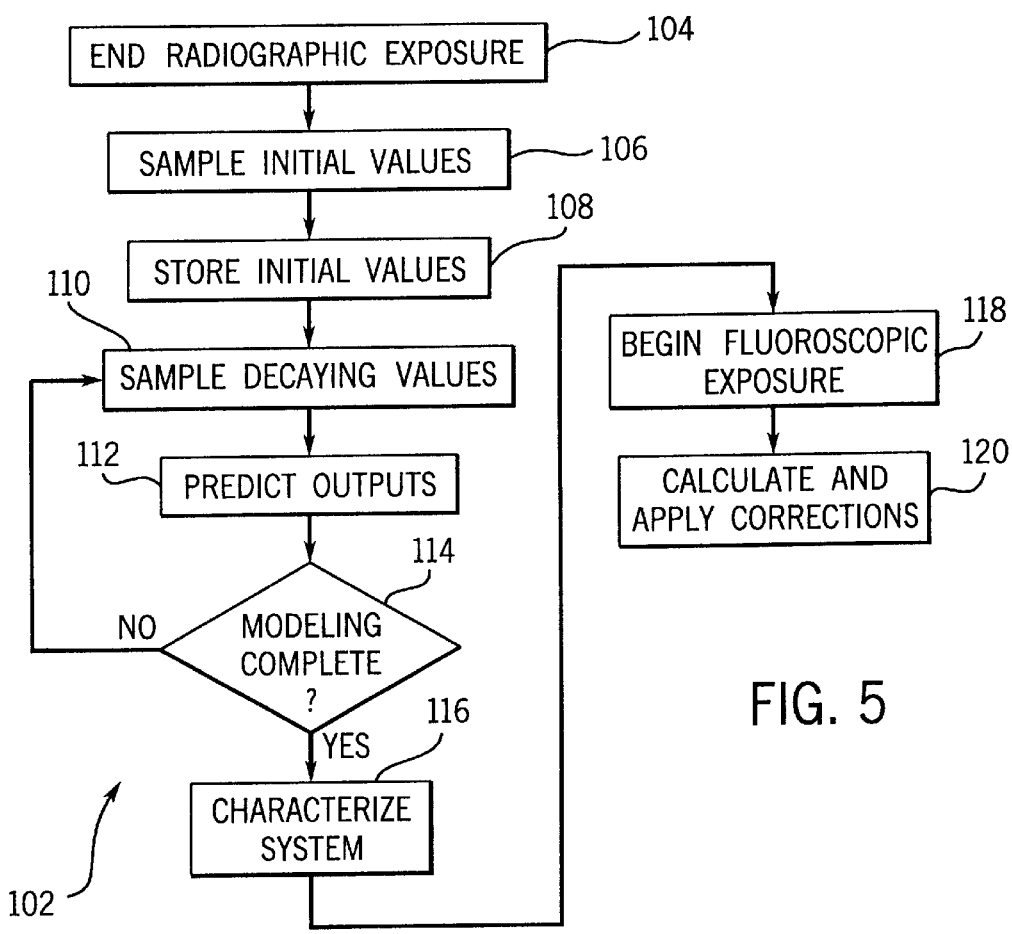
FIG. 5 is a flow chart illustrating exemplary control logic in carrying out the present image retention compensation technique.

As shown in FIG. 5, exemplary control logic for carrying out the prediction and correction technique, designated generally by reference numeral 102, begins with the end of the previous exposure or examination, a radiographic exposure in the example, as indicated at reference numeral 104. Initial values are then sampled at the regular sampling intervals of the imaging system, as indicated at step 106. These initial values are stored as indicated at step 108, and the initial values are used in the modeling process outlined above. As indicated at step 110, decaying values are then continuously sampled at regular sampling intervals throughout the interim period 94. Outputs are continuously predicted as indicated at step 112, based upon the initial values, and the subsequently collected decaying values. At step 114 the control logic determines whether the modeling is complete. If the modeling is not complete, values are continuously sampled and outputs are predicted by returning to step 110. Once the modeling process is complete (ie. A model of the desired order is obtained) the system is characterized, as indicated at step 116, and as described above.

Thereafter, the subsequent examination or exposure may begin, as indicated at step 118 in FIG. 5. Because the subsequent exposure is carried out and data for the exposure is sampled at known sampling intervals following the end of the previous exposure, the predicted retained image values may be calculated for the successive sampling intervals as indicated at step 120 and as described above. Step 120 also indicates that these values are used as corrections or offsets for the data acquired in the subsequent exposure. In practice, the predicted values and corrections may be calculated either previous to the subsequent exposure, during the subsequent exposure, or thereafter. Moreover, the actual acquired values of the second exposure may be immediately corrected, or both these values and the correction values based upon the predicted decay may be stored for subsequent processing.

The foregoing technique was employed for correcting for retained signals in fluoroscopic images after a radiographic exposure. A sampling rate of 30 frames per second was used, with maximum amplifier gain. Radiographic exposure levels of 80% and 200% of the level required to saturate the photodiodes were used. The sequence of fluoroscopic images, containing the decaying signal from the radiographic exposure, was stored for analysis. These measured data sets were then used as a benchmark against which the foregoing technique was analyzed by comparing the predicted values from the same conditions with the measured data. Prediction errors were noted within acceptable bounds. For example, using a sixth order predictor on data obtained after a radiographic exposure that produced a signal in the diodes of 80% of saturation, an error in the predicted value of approximately 25 counts following 30 frames was observed, on a scale of 255 counts. With a thirteenth order predictor and the same data, an error or less than 5 counts was observed. With a thirteenth order predictor on data for which the diode signal reached 200% of saturation, deviation of the prediction from the actual data was about 25 counts after 23 frames. An even higher order predictor (twenty-first order) provided even smaller errors, less than 5 counts even with the diodes in an oversaturated condition.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for compensating for image retention in a digital imaging system, the method comprising the steps of:
   (a) acquiring data for a plurality of pixel regions following a first examination sequence;
   (b) computing a predication model for decay of a retained image based upon the acquired data; and
   (c) correcting image data for a second examination based upon the prediction model.

2. The method of claim 1, wherein the method is performed in a digital x-ray system, and wherein the first examination includes a radiographic exposure and the second examination includes a fluoroscopy exposure.

3. The method of claim 1, wherein the data is acquired at regular sampling intervals between the first and second examinations.

4. The method of claim 3, wherein the prediction model predicts a value of a retained image for each pixel region at the same regular sampling intervals during the second examination.

5. The method of claim 1, wherein the data is acquired from an amorphous silicon radiation detector.

6. The method of claim 1, wherein the prediction model is a linear time-invariant system model.

7. The method of claim 1, wherein a first acquired data set is employed in the prediction model as an initial value, and subsequent acquired data sets are employed to predict decay of the retained image from the initial value.

8. The method of claim 1, comprising the further step of storing predicted decaying image values for each pixel region and for forward-going sampling intervals, and wherein step (c) includes accessing the decaying image values for correction of data of the second examination acquired at corresponding sampling intervals.

9. A method for correcting fluoroscopic image data acquired following a radiographic image sequence, the method comprising the steps of:
   (a) performing a radiographic imaging sequence in which image data for a plurality of pixel regions of a digital detector is sampled;
   (b) acquiring retained image data for the pixel regions following termination of the radiographic imaging sequence;
   (c) applying the retained image data to a prediction model to predict decay of a retained image in the detector;
   (d) performing a fluoroscopic imaging sequence; and
   (e) correcting fluoroscopic image data sampled from the detector during step (d) based upon the decay predicted in step (c).

10. The method of claim 9, wherein the data is collected during steps (a), (b) and (d) at equal sampling intervals.

11. The method of claim 10, wherein the decay of the retained image is predicted in step (c) for at least a portion of the sampling intervals of a the fluoroscopic imaging sequence performed in step (d).

12. The method of claim 10, wherein a first data set is acquired in step (b) following a first sampling interval immediately after termination of the radiographic imaging sequence.

13. The method of claim 12, wherein the first data set is used as an initial data set for the prediction model in step (c).

14. The method of claim 9, comprising the further step of storing predicted retained image decay values for forward-going sampling intervals, the forward-going sampling intervals corresponding at least partially to sampling intervals for the fluoroscopic imaging sequence of step (d).

15. The method of claim 9, wherein the prediction model is a linear time-invariant system model.

16. A digital x-ray imaging system, the system comprising:
   a radiation source;
   a radiation detector for receiving radiation from the source and generating image data based upon the received radiation; and
   a signal processing circuit coupled to the detector for processing the image data, the signal processing circuit being configured to sample retained image data from the detector following a first examination sequence and during a period in which no radiation from the source impacts the detector, to predict decay of a retained image in the detector based upon the retained image data, and to correct image data for a second examination sequence based upon the predicted decay.

17. The system of claim 16, wherein the first examination sequence is a radiographic examination wherein the radiation source emits radiation at a first level, and the second examination sequence is a fluoroscopic examination wherein the radiation source emits radiation at a second level lower than the first level.

18. The system of claim 16, wherein data is sampled from the detector at fixed sampling intervals.

19. The system of claim 16, including a memory circuit for storing predicted retained image decay values, the signal processing circuit accessing the stored values for correction of image data for the second examination sequence.

20. The system of claim 16, wherein the signal processing circuit predicts decay of the retained image based upon a prediction model.

21. The system of claim 20, wherein the prediction model is a linear time-invariant system model.

22. A computer program for correction of image data in a digital x-ray imaging system, the computer program comprising:
   a machine readable medium for storing programming code; and
   programming code stored on the machine readable medium, the programming code providing instructions for a signal processing circuit of an imaging system for analyzing sampled retained image data from an imaging detector acquired following a first examination sequence, predicting decay of a retained image based upon the retained image data, and generating correction values for compensating for the retained image in data acquired in a second examination sequence.

23. The computer program of claim 22, wherein the programming code includes a prediction model for predicting forward-going retained image decay values based upon the retained image data.

24. The computer program of claim 22, wherein the prediction model is a linear, time-invariant model.

25. The computer program of claim 22, wherein the machine readable medium is a resident component of the imaging system.

26. The computer program of claim 22, wherein the programming code is transferred to the machine readable medium via a configurable network connection.

* * * * *